(12) United States Patent
Wiese (10) Patent No.: US 8,472,533 B2
(45) Date of Patent: Jun. 25, 2013

(54) REDUCED-COMPLEXITY COMMON-MODE NOISE CANCELLATION SYSTEM FOR DSL

(75) Inventor: Brian Wiese, San Francisco, CA (US)

(73) Assignee: Broadcom Corporation, Irvine, CA (US)

( * ) Notice: Subject to any disclaimer, the term of this patent is extended or adjusted under 35 U.S.C. 154(b) by 94 days.

(21) Appl. No.: 13/098,891

(22) Filed: May 2, 2011

(65) Prior Publication Data

US 2011/0206104 A1 Aug. 25, 2011

(51) Int. Cl.
*H04B 3/00* (2006.01)
*H04L 25/00* (2006.01)

(52) U.S. Cl.
USPC ........... 375/258; 375/257; 375/285; 375/364; 375/230; 375/222; 370/201; 379/417

(58) Field of Classification Search
USPC ......... 375/258, 257, 284, 285, 346, 229–232, 375/222, 219, 220, 260; 370/201; 279/417
See application file for complete search history.

(56) References Cited

U.S. PATENT DOCUMENTS

| | | |
|---|---|---|
| 4,009,371 A | 2/1977 | Hamilton et al. |
| 4,024,359 A | 5/1977 | DeMarco et al. |
| 4,024,360 A | 5/1977 | Biraghi et al. |
| 4,173,714 A | 11/1979 | Bloch et al. |
| 4,384,355 A | 5/1983 | Werner |
| 4,679,227 A | 7/1987 | Hughes-Hartogs |
| 4,733,389 A | 3/1988 | Puvogel |
| 4,845,466 A | 7/1989 | Hariton et al. |
| 4,882,733 A | 11/1989 | Tanner |
| 4,977,591 A | 12/1990 | Chen et al. |
| 5,285,474 A | 2/1994 | Chow et al. |

(Continued)

FOREIGN PATENT DOCUMENTS

| | | |
|---|---|---|
| EP | 0 377 965 A2 | 7/1990 |
| EP | 0 844 758 A2 | 5/1998 |

(Continued)

OTHER PUBLICATIONS

Magesacher, T. et al. On the Capacity of the Copper Cable Channel Using the Common Mode. Telecommunications Research Center, Vienne, Austria. (5 pages).

(Continued)

*Primary Examiner* — Phuong Phu
(74) *Attorney, Agent, or Firm* — Sterne, Kessler, Goldstein & Fox P.L.L.C.

(57) ABSTRACT

A noise cancellation system has a first transformer with an input side and an output side, the input side having first and second taps coupled to a signal provider, and a center tap providing a first common-mode voltage signal. A first digital subscriber line (xDSL) modem has an input coupled to the output side of the first transformer and an output coupled to customer premises equipment (CPE) for providing an xDSL signal to the CPE. A second transformer has an input side and an output side, the input side having first and second taps coupled to a signal provider, and a center tap providing a second common-mode voltage signal. A second xDSL modem is coupled to the output side of the second transformer. The difference between the first and second common-mode voltage signals is provided to at least one of the first and second xDSL modems to filter out noise from the xDSL signal provided by that modem.

20 Claims, 4 Drawing Sheets

U.S. PATENT DOCUMENTS

| | | | |
|---|---|---|---|
| 5,304,940 A | 4/1994 | Harasawa et al. |
| 5,479,447 A | 12/1995 | Chow et al. |
| 5,483,551 A | 1/1996 | Huang et al. |
| 5,524,125 A | 6/1996 | Tsujimoto |
| 5,555,274 A | 9/1996 | Sheets |
| 5,559,890 A | 9/1996 | Obermeier et al. |
| 5,596,258 A | 1/1997 | Kimura et al. |
| 5,596,439 A | 1/1997 | Dankberg et al. |
| 5,627,859 A | 5/1997 | Parr |
| 5,703,904 A | 12/1997 | Langberg |
| 5,768,473 A | 6/1998 | Eatwell et al. |
| 5,790,550 A | 8/1998 | Peeters et al. |
| 5,815,538 A | 9/1998 | Grell et al. |
| 5,818,872 A | 10/1998 | Gupta |
| 5,844,940 A | 12/1998 | Goodson et al. |
| 5,852,630 A | 12/1998 | Langberg et al. |
| 5,867,539 A | 2/1999 | Koslov |
| 5,901,205 A | 5/1999 | Smith et al. |
| 5,909,178 A | 6/1999 | Balch et al. |
| 5,930,268 A | 7/1999 | Kurby et al. |
| 5,952,914 A | 9/1999 | Wynn |
| 5,974,098 A | 10/1999 | Tsuda |
| 5,978,373 A | 11/1999 | Hoff et al. |
| 5,978,760 A | 11/1999 | Rao et al. |
| 6,006,083 A | 12/1999 | Tong et al. |
| 6,014,376 A | 1/2000 | Abreu et al. |
| 6,052,420 A | 4/2000 | Yeap et al. |
| 6,118,769 A | 9/2000 | Pries et al. |
| 6,147,963 A | 11/2000 | Walker et al. |
| 6,161,209 A | 12/2000 | Moher |
| 6,185,429 B1 | 2/2001 | Gehrke et al. |
| 6,205,220 B1 | 3/2001 | Jacobsen et al. |
| 6,205,410 B1 | 3/2001 | Cai |
| 6,212,227 B1 | 4/2001 | Ko et al. |
| 6,226,322 B1 | 5/2001 | Mukherjee |
| 6,256,326 B1 | 7/2001 | Kudo |
| 6,266,347 B1 | 7/2001 | Amrany et al. |
| 6,266,422 B1 | 7/2001 | Ikeda |
| 6,295,323 B1 | 9/2001 | Gabara |
| 6,330,275 B1 | 12/2001 | Bremer |
| 6,345,071 B1 | 2/2002 | Hamdi |
| 6,351,509 B1 | 2/2002 | Vitenberg et al. |
| 6,359,926 B1 | 3/2002 | Isaksson |
| 6,363,109 B1 | 3/2002 | Polley et al. |
| 6,378,234 B1 | 4/2002 | Luo |
| 6,396,827 B1 | 5/2002 | Paivike et al. |
| 6,411,657 B1 | 6/2002 | Verbin et al. |
| 6,433,819 B1 | 8/2002 | Li et al. |
| 6,445,773 B1 | 9/2002 | Liang et al. |
| 6,456,673 B1 | 9/2002 | Wiese et al. |
| 6,459,739 B1 | 10/2002 | Vitenberg |
| 6,466,588 B1 | 10/2002 | Michaels |
| 6,493,395 B1 | 12/2002 | Isaksson et al. |
| 6,498,808 B1 | 12/2002 | Tzannes |
| 6,507,608 B1 | 1/2003 | Norrell |
| 6,519,291 B1 | 2/2003 | Dagdeviren et al. |
| 6,542,028 B1 | 4/2003 | Norrell et al. |
| 6,546,025 B1 | 4/2003 | Dupuy |
| 6,556,635 B1 | 4/2003 | Dehghan |
| 6,597,732 B1 | 7/2003 | Dowling |
| 6,621,346 B1 | 9/2003 | Nabicht et al. |
| 6,631,175 B2 | 10/2003 | Harikumar et al. |
| 6,633,545 B1 | 10/2003 | Milbrandt |
| 6,647,070 B1 | 11/2003 | Shalvi et al. |
| 6,674,795 B1 | 1/2004 | Liu et al. |
| 6,690,666 B1 | 2/2004 | Norrell et al. |
| 6,721,394 B1 | 4/2004 | Murphy et al. |
| 6,731,914 B2 | 5/2004 | Creigh et al. |
| 6,738,418 B1 | 5/2004 | Stiscia et al. |
| 6,754,170 B1 | 6/2004 | Ward |
| 6,763,061 B1 | 7/2004 | Strait et al. |
| 6,775,241 B1 | 8/2004 | Levin |
| 6,791,995 B1 | 9/2004 | Azenkot et al. |
| 6,798,735 B1 | 9/2004 | Tzannes et al. |
| 6,822,998 B1 | 11/2004 | Yun et al. |
| 6,826,404 B2 | 11/2004 | Delfs et al. |
| 6,839,429 B1 | 1/2005 | Gaikwad et al. |
| 6,859,488 B2 | 2/2005 | Azenkot et al. |
| 6,871,066 B1 | 3/2005 | Khullar et al. |
| 6,888,497 B2 | 5/2005 | King et al. |
| 6,898,236 B1 | 5/2005 | Sun |
| 6,934,345 B2 | 8/2005 | Chu et al. |
| 6,940,973 B1 | 9/2005 | Yeap et al. |
| 6,965,636 B1 | 11/2005 | DesJardins et al. |
| 6,999,504 B1 | 2/2006 | Amrany et al. |
| 6,999,507 B2 | 2/2006 | Jin |
| 7,023,910 B1 | 4/2006 | Norrell |
| 7,031,669 B2 | 4/2006 | Vaidyanathan et al. |
| 7,035,661 B1 | 4/2006 | Yun |
| 7,085,315 B1 | 8/2006 | Kelton |
| 7,085,539 B2 | 8/2006 | Furman |
| 7,120,211 B2 | 10/2006 | Shmulyian et al. |
| 7,155,007 B1 | 12/2006 | Upton |
| 7,174,022 B1 | 2/2007 | Zhang et al. |
| 7,177,419 B2 | 2/2007 | Sedarat et al. |
| 7,184,467 B2 | 2/2007 | Jacobsen et al. |
| 7,200,196 B2 | 4/2007 | Li et al. |
| 7,215,727 B2 | 5/2007 | Yousef et al. |
| 7,221,722 B2 | 5/2007 | Thomas et al. |
| 7,240,252 B1 | 7/2007 | Fessler et al. |
| 7,260,117 B2 | 8/2007 | Long et al. |
| 7,283,509 B2 | 10/2007 | Moon et al. |
| 7,283,598 B2 | 10/2007 | Akita et al. |
| 7,302,379 B2 | 11/2007 | Cioffi et al. |
| 7,315,592 B2 * | 1/2008 | Tsatsanis et al. ............. 375/346 |
| 7,315,967 B2 | 1/2008 | Azenko et al. |
| 7,330,544 B2 | 2/2008 | D'Angelo et al. |
| 7,356,049 B1 | 4/2008 | Rezvani |
| 7,366,258 B2 | 4/2008 | Kolze et al. |
| 7,369,607 B2 | 5/2008 | Sedarat |
| 7,421,015 B2 | 9/2008 | Sedarat |
| 7,433,395 B2 | 10/2008 | Sedarat |
| 7,443,916 B2 | 10/2008 | Sedarat et al. |
| 7,502,336 B2 | 3/2009 | Romano et al. |
| 7,529,984 B2 | 5/2009 | Heise |
| 7,555,037 B2 | 6/2009 | Sedarat |
| 7,630,489 B2 | 12/2009 | Oksman et al. |
| 7,813,439 B2 | 10/2010 | Norrell et al. |
| 7,852,950 B2 | 12/2010 | Sedarat |
| 7,953,163 B2 | 5/2011 | Wiese |
| 2001/0009850 A1 | 7/2001 | Kushige |
| 2001/0011019 A1 | 8/2001 | Jokimies |
| 2001/0055332 A1 | 12/2001 | Sadjadpour et al. |
| 2002/0001340 A1 | 1/2002 | Shenoi et al. |
| 2002/0044597 A1 | 4/2002 | Shively et al. |
| 2002/0057713 A1 | 5/2002 | Bagchi et al. |
| 2002/0078247 A1 | 6/2002 | Lu et al. |
| 2002/0080862 A1 | 6/2002 | Ali |
| 2002/0122515 A1 | 9/2002 | Bodenschatz |
| 2002/0154620 A1 | 10/2002 | Azenkot et al. |
| 2002/0163959 A1 | 11/2002 | Haddad |
| 2003/0021240 A1 | 1/2003 | Moon et al. |
| 2003/0035469 A1 | 2/2003 | Frank et al. |
| 2003/0043925 A1 | 3/2003 | Stopler et al. |
| 2003/0048368 A1 | 3/2003 | Bosco et al. |
| 2003/0055996 A1 | 3/2003 | Mori et al. |
| 2003/0091053 A1 | 5/2003 | Tzannes et al. |
| 2003/0099285 A1 | 5/2003 | Graziano et al. |
| 2003/0099286 A1 | 5/2003 | Graziano et al. |
| 2003/0099350 A1 | 5/2003 | Bostoen et al. |
| 2003/0108094 A1 | 6/2003 | Lai et al. |
| 2003/0112860 A1 | 6/2003 | Erdogan |
| 2003/0112887 A1 | 6/2003 | Sang et al. |
| 2003/0124983 A1 | 7/2003 | Parssinen et al. |
| 2003/0185176 A1 | 10/2003 | Lusky et al. |
| 2003/0206579 A1 | 11/2003 | Bryant |
| 2003/0227967 A1 | 12/2003 | Wang et al. |
| 2004/0057502 A1 | 3/2004 | Azenkot et al. |
| 2004/0066865 A1 | 4/2004 | Yousef et al. |
| 2004/0071240 A1 | 4/2004 | Betts |
| 2004/0085987 A1 | 5/2004 | Gross et al. |
| 2004/0087278 A1 | 5/2004 | Lin et al. |
| 2004/0091025 A1 | 5/2004 | Sindhushayana et al. |
| 2004/0111345 A1 | 6/2004 | Chuang et al. |
| 2004/0125015 A1 | 7/2004 | King et al. |
| 2004/0141548 A1 | 7/2004 | Shattil |
| 2004/0156441 A1 | 8/2004 | Peeters et al. |

| | | | |
|---|---|---|---|
| 2004/0176063 | A1 | 9/2004 | Choi |
| 2004/0185852 | A1 | 9/2004 | Son et al. |
| 2004/0213170 | A1 | 10/2004 | Bremer |
| 2004/0223449 | A1 | 11/2004 | Tsuie et al. |
| 2005/0041753 | A1 | 2/2005 | Cunningham |
| 2005/0047489 | A1 | 3/2005 | Yousef et al. |
| 2005/0047514 | A1 | 3/2005 | Bolinth et al. |
| 2005/0053229 | A1 | 3/2005 | Tsatsanis et al. |
| 2005/0094550 | A1 | 5/2005 | Huh et al. |
| 2005/0099967 | A1 | 5/2005 | Baba |
| 2005/0111561 | A1 | 5/2005 | Sedarat et al. |
| 2005/0143008 | A1 | 6/2005 | Bailey |
| 2005/0159128 | A1 | 7/2005 | Collins et al. |
| 2005/0169357 | A1 | 8/2005 | Sedarat |
| 2005/0190825 | A1 | 9/2005 | Sedarat |
| 2005/0190848 | A1 | 9/2005 | Kiyanagii et al. |
| 2005/0190871 | A1 | 9/2005 | Sedarat |
| 2005/0216441 | A1 | 9/2005 | Thomas et al. |
| 2005/0271129 | A1 | 12/2005 | Reina |
| 2005/0276355 | A1 | 12/2005 | Chow et al. |
| 2006/0002457 | A1 | 1/2006 | Romano et al. |
| 2006/0019687 | A1 | 1/2006 | Garg et al. |
| 2006/0039550 | A1 | 2/2006 | Chadha et al. |
| 2006/0056305 | A1 | 3/2006 | Oksman et al. |
| 2006/0062379 | A1 | 3/2006 | Sedarat et al. |
| 2006/0067388 | A1 | 3/2006 | Sedarat et al. |
| 2006/0078044 | A1 | 4/2006 | Norrell et al. |
| 2006/0083321 | A1 | 4/2006 | Sedarat |
| 2006/0083322 | A1 | 4/2006 | DesJardins et al. |
| 2006/0083323 | A1 | 4/2006 | DesJardins et al. |
| 2006/0083324 | A1 | 4/2006 | DesJardins et al. |
| 2006/0115030 | A1 | 6/2006 | Erving et al. |
| 2006/0126747 | A1 | 6/2006 | Wiese |
| 2006/0171480 | A1 | 8/2006 | Erving et al. |
| 2006/0193390 | A1 | 8/2006 | Sedarat |
| 2006/0203843 | A1 | 9/2006 | Liu |
| 2006/0222098 | A1 | 10/2006 | Sedarat et al. |
| 2006/0227913 | A1 | 10/2006 | Sedarat |
| 2006/0253515 | A1 | 11/2006 | Sedarat |
| 2006/0291537 | A1 | 12/2006 | Fullerton et al. |
| 2007/0002940 | A1 | 1/2007 | Zhou |
| 2007/0183526 | A1 | 8/2007 | Norrell et al. |
| 2007/0217492 | A1 | 9/2007 | Cox et al. |
| 2008/0232444 | A1 | 9/2008 | Tzannes |
| 2008/0317110 | A1 | 12/2008 | Sedarat |
| 2010/0091827 | A1 | 4/2010 | Wiese |

FOREIGN PATENT DOCUMENTS

| | | | |
|---|---|---|---|
| EP | 0 966 134 | A2 | 12/1999 |
| EP | 1 388 944 | A1 | 2/2004 |
| EP | 1 389 846 | A2 | 2/2004 |
| WO | WO 2006/042274 | A1 | 4/2006 |
| WO | WO 2010/042350 | | 4/2010 |

OTHER PUBLICATIONS

Yeap, T. H. et al. Novel common mode noise cancellation techniques for xDSL applications. School of Inf. Technology & Engineering. University of Ottawa, Ontario. Instrumentation and Measurement Technology Conference, 2002. vol. 2. pp. 1125-1128. (Abstract). Aug. 7, 2002.

Ahmed, Nadeem, et al., "Optimal Transmit Spectra for Communication in the Presence of Crosstalk and Imperfect Echo Cancellation," *IEEE Globecom*, pp. 364-368, Nov. 2001.

Al-Dhahir, Naofal, et al., "Optimum Finite-Length Equalization for Multicarrier Transceivers," *IEEE Transactions on Communications*, vol. 44, No. 1, pp. 56-64, Jan. 1996.

Armada, Ana Garcia, et al., "Mulit-User Constant-Energy Bit Loading for M-PSK-Modulated Orthogonal Frequency Division Multiplexing," *IEEE Wireless Communications and Networking Conferenece*, pp. 526-530, Copyright 2002.

Arslan, G., et al., "Equalization for Discrete Multitone Transceivers to Maximize Bit Rate," *IEEE Transactions on Signal Processing*, vol. 49, No. 12, pp. 3123-3135, Dec. 2001.

Baccarelli, Enzo, et al., "Novel Efficient Bit-Loading Algorithms for Peak-Energy Limited ADSL-Type Multicarrier Systems," *IEEE Transactions on Signal Processing*, vol. 50, No. 5, pp. 1237-1247, May 2002.

Barreto, Andre Noll, et al., "Adaptive Bit Loading for Wireless OFDM Systems," *IEEE International Symposium on Personal, Indoor, and Mobile Radio Communications*, pp. G-88-G-92, Oct. 2001.

Bingham, John A.C., et al., "Multicarrier Modulation for Data Transmission: An Idea Whose Time Has Come," *IEEE Communications Magazine*, pp. 5-8, 11-14, May 1990.

Blahut, Richard E., *Theory and Practice of Error Control Codes*, ISBN No. 0-201-10102-5, Chapter 7: Bose-Chaudhuri-Hocquenghem Codes, pp. 161-206, Copyright 1984.

Blahut, Richard E., *Theory and Practice of Error Control Codes*, ISBN No. 0-201-10102-5, Chapter 11: Fast Algorithms, pp. 308-346, Copyright 1984.

Campello, Jorge, "Optimal Discrete Bit Loading for Multicarrier Modulation Systems," *IEEE International Symposium on Information Theory*, Cambridge, MA, p. 193, Aug. 1998.

Chow, Peter S., et al., "A Practical Discrete Multitone Transceiver Loading Algorithm for Data Transmission Over Spectrally Shaped Channels," *IEEE Transactions on Communications*, vol. 43, No. 2, pp. 773-775, 1995.

Cioffi, J. et al., *Analog RF Cancelation with SDMT (96-084)*, TIE1. 4/96-084 Contribution, Amati Communications Corporation, pp. 1-9, Apr. 22, 1996.

Cioffi, J.M. et al., "Generalized Decision-Feedback Equalization for Packet Transmission with ISI and Gaussian Noise," In *Communications, Computation, Control, and Signal Processing, a Tribute to Thomas Kailath*, Kluwer Academic Publishers, pp. 79-127, 1997.

*Communication pursuant to Rules 109 and 110 EPC*, for European Patent Appl. No. 0580662.2-1525, 2 pages, dated May 21, 2007.

*Communication pursuant to Article 94(3), EPC*, for European Patent Appl. No. 0506662.2-1525, 4 pages, dated Feb. 26, 2008.

*Draft Standard—Network and Customer Installation Interfaces—Asymmetric Digital Subscriber Line (ADSL) Metallic Interface*, Draft American National Standard for Telecommunications, Alliance for Telecommunications Industry Solutions, Doc. No. T10413-1998, pp. 1-248, Nov. 30-Dec. 4, 1998.

Farhang-Boroujeny, Behrouz, et al., "Design Methods for Time-Domain Equalizers in DMT Transceivers," *IEEE Transactions on Communications*, vol. 49, No. 3, pp. 554-562, Mar. 2001.

Fischer, Robert F.H., et al., "A New Loading Algorithm for Discrete Multitone Transmission," *IEEE Globecom*, pp. 724-728, 1996.

Franklin, Curt, "How DSL Works," How Stuff Works, printed Nov. 16, 2004 from http://computer.howstuffworks.com/dsl.htm/printable, 6 pages.

Fukuda, Misao, et al., "A Line Terminating LSI Using Echo Cancelling Method for ISDN Subscriber Loop Transmission," *IEEE Journal on Selected Areas in Communications*, vol. 6, No. 3, pp. 476-483, Apr. 1988.

Henkel, Werner, et al., "Maximizing the Channel Capacity of Multicarrier Transmission by Suitable Adaptation of the Time-Domain Equalizer," *IEEE Transactions on Communications*, vol. 48, No. 12, pp. 2000-2004, Dec. 2000.

*International Preliminary Report on Patentability*, for International Appl. No. PCT/US2005/023634, filed Jun. 30, 2005, 4 pages, mailed Jan. 9, 2007.

*International Preliminary Report on Patentability*, for International Appl. No. PCT/US2005/036655, filed Oct. 11, 2005, 6 pages, mailed Apr. 11, 2007.

*International Preliminary Report on Patentability*, for International Appl. No. PCT/US2007/001997, filed Jan. 25, 2007, 6 pages, mailed Aug. 12, 2008.

*International Telecommunication Union (ITU) Recommendation G.992.1, Asymmetric digital subscriber line (ADSL) transceivers*, Series G: Transmission Systems and Media, Digital Systems and Networks, pp. 1-240, Jun. 1999.

*International Telecommunication Union (ITU) Recommendation G.992.2, Splitterless asymmetric digital subscriber line (ASDL) transceivers*, Series G: Transmission Systems and Media, Digital Systems and Networks, pp. 1-165, Jun. 1999.

*International Telecommunication Union (ITU) Recommendation G.992.3, Asymmetric digital subscriber line transceivers 2 (ASDL 2)*, Series G: Transmission Systems and Media, Digital Systems and Networks, pp. 1-300, Jul. 2002.

*International Telecommunications Union (ITU) Recommendation G.993.1, Very high speed digital subscriber line transceivers*, Series G: Transmission Systems and Media, Digital Systems and Networks, pp. 1-217, Jun. 2004.

Kamkar-Parsi et al., "Wideband Crosstalk Interface Cancelling on xDSL Using Adaptive Signal Processing and Common Mode Signal," *IEEE International Conference on Acoustics, Speech, and Signal Processing*, pp. IV-1045-IV-1048, 2004.

Karp et al., "Zero-forcing frequency domain equalization for DMT systems with insufficient guard interval," *IEEE International Conference on Acoustics, Speech, and Signal Processing*, pp. 221-224, 2003.

Krongold, Brian S., et al., "Computationally Efficient Optimal Power Allocation Algorithms for Multicarrier Communications Systems," *IEEE Transactions on Communications*, vol. 48, pp. 23-27, Jan. 2000.

Lampe, Lutz H.J., et al., "Performance Evaluation of Non-Coherent Transmission Over Power Lines," *Proceedings of International Symposium on Power-Line Communications (ISPLC 2000)*, pp. 23-30, Limerick, Ireland, 2000.

Lashkarian, Navid, et al., "Fast Algorithm for Finite-Length MMSE Equalizers with Application to Discrete Multitone Systems," *IEEE International Conference on Acoustics, Speech, and Signal Processing*, pp. 2753-2756, 1999.

Leke, Achankeng et al., "A Maximum Rate Loading Algorithm for Discrete Multitone Modulation Systems,"0 *IEEE Globecom*, pp. 1514-1518, 1997.

Magesacher, Thomas, et al., "Adaptive Interference Cancellation Using Common-Mode Information in DSL," *Proceedings of European Signal Processing Conference*, 4 pages, Sep. 2005.

Magesacher, Thomas et al., "Analysis of Adaptive Interference Cancellation Using Common-Mode Information in Wireline Communications," *EURASIP Journal on Advances in Signal Processing*, vol. 2007, Article 84956, 11 pages, Jun. 2007.

Magesacher, Thomas et al., "Information Rate Bounds in Common-Mode Aided Wireline Communications," *European Transactions on Telecommunications*, vol. 17, No. 5, pp. 533-545, Oct. 2006.

Melsa, Peter J.W., et al., "Impulse Response Shortening for Discrete Multitone Transceivers," *IEEE Transactions on Communications*, vol. 44, No. 12, pp. 1662-1672, Dec. 1996.

Milosevic et al., *Simultaneous Multichannel Time Domain Equalizer Design Based on the Maximum Composite Shortening SNR*, Dept. of Electrical and Compter Eng., The University of Texas, Austin, Texas, 5 pages, 2002.

Okamura, Yasuka et al., "ADSL System for Time Periodic Noise Environments," *NEC Res. & Develop.*, vol. 40, No. 1, pp. 64-69, Jan. 1999.

*PCT Search Report and Written Opinion of the International Searching Authority*, International Application No. PCT/US2005/023634, filed Jun. 30, 2005, 5 pages, mailed May 4, 2006.

*PCT Search Report an Written Opinion of the International Searching Authority*, International Application No. PCT/US2005/036655, filed Oct. 11, 2005, 7 pages, mailed Feb. 14, 2006.

*PCT Search Report and Written Opinion of the International Searching Authority*, International Application No. PCT/US2007/001997, filed Jan. 25, 2007, 8 pages, mailed Jul. 18, 2007.

*PCT Search Report and Written Opinion of the International Searching Authority*, International Application No. PCT/US2006/009687, filed Mar. 16, 2006, 6 pages, mailed Nov. 16, 2007.

*PCT Search Report and Written Opinion of the International Searching Authority*, International Application No. PCT/US2006/010004, filed Mar. 16, 2006, 5 pages, mailed Oct. 10, 2007.

*PCT Search Report and Written Opinion of the International Searching Authority*, International Application No. PCT/US2006/009804, filed Mar. 17, 2006, 8 pages, mailed Apr. 2, 2008.

*PCT Search Report and Written Opinion of the International Searching Authority*, International Application No. PCT/US2009/058821, filed Sep. 29, 2009, 8 pages, mailed Dec. 2, 2009.

Perez-Alvarez, Ivan A., et al., "A Differential Error Reference Adaptive Echo Canceller for Multilevel PAM Line Codes," Work supported by National Project T1C95-0026, *IEEE International Conference on Acoustics, Speech, and Signal Process*, pp. 1707-1710, May 1996.

Sedarat, Hossein, et al., "Impulse Noise Protection for Multi-Carrier Communication Systems," *IEEE International Conference on Acoustics, Speech, and Signal Processing*, vol. 3, pp. iii/853-iii/856, 2005.

Sedarat, Hossein, et al., "Multicarrier Bit-Loading in Presence of Biased Gaussian Noise Sources," *IEEE Consumer Communication and Networking Conference*, 5 pages, Jan. 2005.

Sonalkar, Ranjan, et al., "An Efficient Bit-Loading Algorithm for DMT Application," *IEEE Communications Letters*, vol. 4, pp. 80-82, Mar. 2000.

Sonalkar, Ranjan, et al., "Shannon Capacity of Frequency-Overlapped Digital Subscriber Loop Channels," *IEEE International Conference on Communications*, pp. 1741-1745, Aug. 2002.

Starr, Thomas et al., *Understanding Digital Subscriber Line Technology*, Prentice Hall PTR, ISBN 0-13-780545-4, Upper Saddle River, NJ, pp. 94-97, 147-154, 206-217, 241-251, and 330-331, 1999.

*STLC60134S: TOSCA Integrated ADSL. CMOS Analog Front-end Circuit*, STMicroelectronics, 22 pages, Aug. 1999.

Toumpakaris, D. "A byte-erasure method for improved impulse immunity in DSL systems using soft information from an inner code," *IEEE International Conference on Communications (ICC)*, vol. 4, pp. 2431-2435, May 2003.

Toumpakaris, D., "A Square Distance-Based Byte-Erasure Method for Reduced-delay Protection of DSL Systems from Non-stationary Interference," *IEEE International Conference on Communications (ICC)*, vol. 4, pp. 2114-2119, San Francisco, CA, Dec. 2003.

Toumpakaris, D., "Reduced Delay Protection of DSL Systems Against Nonstationary Disturbances," *IEEE Transactions on Communications*, vol. 52, No. 11, pp. 1927-1938, Nov. 2004.

Wu, Cheng-Shing, et al., "A Novel Cost-Effective Multi-Path Adaptive Interpolated FIR (IFIR)-Based Echo Canceller," *IEEE International Symposium on Circuits and Systems*, pp. V-453-V-456, Copyright 2000.

Wyglinski, Alexander M., et al., "An Efficient Bit Allocation for Multicarrier Modulation," *IEEE Wireless Communication, Networking Conference*, Atlanta, GA, 6 pages, Mar. 2004.

Yeap, T. H. et al., "Novel Common Mode Noise Cancellation Techniques for xDSL Applications", *Proc. of IEEE Instrumentation and Measurement Technology Conference*, Anchorage, AK, May 2002, pp. 1125-1128.

Zogakis, T.N., et al., "Impulse Noise Mitigation Strategies for Multicarrier Modulation," *Proceedings of the International Conference on Communications (ICC)*, vol. 3, pp. 784-788, May 23, 1993.

Non-Final Office Action dated Oct. 30, 2007, U.S. Appl. No. 11/067,434, filed Feb. 25, 2005, Sedarat, 11 pages.

Final Office Action dated Apr. 29, 2008, U.S. Appl. No. 11/067,434, filed Feb. 25, 2005, Sedarat, 13 pages.

Non-Final Office Action dated Jul. 21, 2008, U.S. Appl. No. 11/067,434, filed Feb. 25, 2005, Sedarat, 9 pages.

Non-Final Office Action dated Jan. 6, 2009, U.S. Appl. No. 11/067,434, filed Feb. 25, 2005, Sedarat, 17 pages.

Non-Final Office Action dated Aug. 19, 2009, U.S. Appl. No. 11/067,434, filed Feb. 25, 2005, Sedarat, 11 pages.

Final Office Action dated May 27, 2010, U.S. Appl. No. 11/067,434, filed Feb. 25, 2005, Sedarat, 12 pages.

Notice of Allowance dated Sep. 15, 2010, U.S. Appl. No. 11/067,434, filed Feb. 25, 2005, Sedarat, 8 pages.

Non-Final Office Action dated May 16, 2008, U.S. Appl. No. 11/131,392, filed May 16, 2005, Wiese, 10 pages.

Non-Final Office Action dated Dec. 10, 2008, U.S. Appl. No. 11/131,392, filed May 16, 2005, Wiese, 18 pages.

Non-Final Office Action dated Jun. 9, 2009, U.S. Appl. No. 11/131,392, filed May 16, 2005, Wiese, 17 pages.

Non-Final Office Action dated Jul. 14, 2010, U.S. Appl. No. 11/131,392, filed May 16, 2005, Wiese, 15 pages.

Non-Final Office Action dated Aug. 21, 2008, U.S. Appl. No. 11/248,704, filed Oct. 11, 2005, Norrell et al, 12 pages.

Non-Final Office Action dated Feb. 4, 2009, U.S. Appl. No. 11/248,704, filed Oct. 11, 2005, Norrell et al, 16 pages.

Final Office Action dated Aug. 5, 2009, U.S. Appl. No. 11/248,704, filed Oct. 11, 2005, Norrell et al, 19 pages.

Non-Final Office Action dated Jun. 14, 2010, U.S. Appl. No. 11/248,704, filed Oct. 11, 2005, Norrell et al, 18 pages.

Final Office Action dated Dec. 6, 2010, U.S. Appl. No. 11/248,704, filed Oct. 11, 2005, Norrell et al., 10 pages.
Non-Final Office Action dated Apr. 14, 2011, U.S. Appl. No. 11/248,704, filed Oct. 11, 2005, Norrell et al, 16 pages.
Non-Final Office Action dated Oct. 26, 2011, U.S. Appl. No. 11/248,704, filed Oct. 11, 2005, Norrell et al, 15 pages.
Non-Final Office Action dated Nov. 26, 2008, U.S. Appl. No. 11/348,733, filed Feb. 6, 2006, Norrell et al, 8 pages.
Non-Final Office Action dated Apr. 8, 2009, U.S. Appl. No. 11/348,733, filed Feb. 6, 2006, Norrell et al, 9 pages.
Non-Final Office Action dated Oct. 23, 2009, U.S. Appl. No. 11/348,733, filed Feb. 6, 2006, Norrell et al, 11 pages.
Notice of Allowance dated Apr. 29, 2010, U.S. Appl. No. 11/348,733, filed Feb. 6, 2006, Norrell et al, 8 pages.
Non-Final Office Action dated Feb. 24, 2009, U.S. Appl. No. 11/377,114, filed Mar. 15, 2006, Sedarat, 10 pages.
Final Office Action dated Jul. 31, 2009, U.S. Appl. No. 11/377,114, filed Mar. 15, 2006, Sedarat, 13 pages.
Non-Final Office Action dated Aug. 30, 2010, U.S. Appl. No. 11/377,114, filed Mar. 15, 2006, Sedarat, 11 pages.
Final Office Action dated Jan. 4, 2011, U.S. Appl. No. 11/377,114, filed Mar. 15, 2006, Sedarat, 13 pages.
Non-Final Office Action dated Jul. 26, 2011, U.S. Appl. No. 11/377,114, filed Mar. 15, 2006, Sedarat, 11 pages.
Final Office Action dated Nov. 28, 2011, U.S. Appl. No. 11/377,114, filed Mar. 15, 2006, Sedarat, 13 pages.
Non-Final Office Action dated Nov. 9, 2007, U.S. Appl. No. 11/377,083, filed Mar. 15, 2006, Sedarat, 11 pages.
Non-Final Office Action dated May 19, 2008, U.S. Appl. No. 11/377,083, filed Mar. 15, 2006, Sedarat, 14 pages.
Notice of Allowance dated May 18, 2009, U.S. Appl. No. 11/377,083, filed Mar. 15, 2006, Sedarat, 7 pages.
Final Office Action dated Dec. 4, 2008, U.S. Appl. No. 11/377,083, filed Mar. 15, 2006, Sedarat, 10 pages.
Non-Final Office Action dated Dec. 11, 2008, U.S. Appl. No. 11/377,084, filed Mar. 15, 2006, Sedarat et al, 10 pages.
Non-Final Office Action dated Aug. 4, 2009, U.S. Appl. No. 11/377,084, filed Mar. 15, 2006, Sedarat et al, 12 pages.
Final Office Action dated Jul. 8, 2010, U.S. Appl. No. 11/377,084, filed Mar. 15, 2006, Sedarat et al, 11 pages.
Non-Final Office Action dated Aug. 16, 2011, U.S. Appl. No. 12/287,577, filed Oct. 10, 2008, Wiese et al, 13 pages.
Notice of Allowance dated Nov. 15, 2011, U.S. Appl. No. 12/287,577, filed Oct. 10, 2008, Wiese et al, 9 pages.

* cited by examiner

FIG. 4

REDUCED-COMPLEXITY COMMON-MODE NOISE CANCELLATION SYSTEM FOR DSL

CROSS-REFERENCE TO RELATED APPLICATIONS

This application is related to commonly owned U.S. patent application Ser. No. 12/287,577, filed Oct. 8, 2008, now Publication No. US 2010/0091827, the disclosure of which is incorporated herein by reference in its entirety as though set forth in full below.

BACKGROUND OF THE INVENTION

1. Field of the Invention

The present invention relates generally to DSL reference noise cancellers.

2. Background Art

Digital subscriber line (DSL) technologies provide potentially large bandwidth for digital communication over existing telephone subscriber lines. Asymmetric DSL (ADSL) and very-high-speed DSL (VDSL) can adapt to the characteristics of the subscriber line by using a discrete multitone (DMT) line code that assigns a number of bits to each tone (or subcarrier). The number of bits can be adjusted to channel conditions as determined during initialization and subsequent on-line reconfiguration known as "bit-swapping" of the DSL modems at each end of the subscriber line.

ADSL and ADSL2+ services operate in the frequency range of 138 KHz to 2.2 MHz. The nearly 5,000 AM radio stations in use in the United States operate at frequencies in the range of 540 KHz to 1.7 MHz. These radio signals are broadcast generally and can interfere with DSL modem operations. In addition, other sources of radio frequency (RF) interference, including, but not limited to ham radio signals, crosstalk, impulse noise and other man-made electronic radiation, can contribute to a deterioration in DSL system performance as a result of the interference they cause.

Very-high-bitrate DSL (VDSL or VHDSL) provides faster data transmission than ADSL or ADSL2+ over a single flat untwisted or twisted pair of copper wires (up to 52 Mbit/s downstream and 16 Mbit/s upstream), and on coaxial cable (up to 85 Mbit/s down- and upstream). VDSL utilizes the frequency band from 25 kHz to 12 MHz. These fast speeds mean that VDSL is capable of supporting high bandwidth applications such as HDTV, as well as telephone services (voice over IP) and general Internet access, over a single connection. VDSL is deployed over existing wiring used for POTS and lower-speed DSL connections.

Second-generation VDSL (VDSL2) utilizes frequencies of up to 30 MHz to provide data rates exceeding 100 Mbit/s simultaneously in both the upstream and downstream directions. The maximum available bit rate is achieved at a range of about 300 meters; performance degrades as the loop attenuation increases.

Currently, standard VDSL uses up to 7 different frequency bands. This enables data rates to be customized between upstream and downstream depending on the service offering and spectrum regulations. First generation VDSL standard specified both quadrature amplitude modulation (QAM) and discrete multi-tone modulation (DMT).

Throughout this disclosure, ADSL, ADSL2+, VDSL, and VDSL2 will be collectively referred to as xDSL.

On transmission lines in DMT communication systems, such as xDSL, the data signal is generally transmitted differentially. Interference such as radio-frequency interference (RFI), crosstalk and impulse noise electromagnetically couples into both the common mode and the differential mode of such transmission lines. In the case of a binder containing multiple transmission lines, such interference may couple into some or all of the transmission lines in the binder and such noise may be correlated between lines.

Conventional techniques for reducing differential noise, thereby improving data rates over the xDSL, include use of common-mode information. In a traditional xDSL system, the common-mode voltage is measured relative to chassis or board ground, an estimate of the differential-mode interference is constructed and the interference estimate is subtracted from the desired signal.

RF interference often couples most strongly to telephone lines between customer premises equipment (CPE) and pedestals (i.e., service terminals) and the like. Pedestals offer a cross-connection point between lines going from a central office (or remote terminal central office) to a specific customer premises or a few customer premises (often referred to as a "drop"). The remainder of lines from the Central Office may continue to other pedestals. Typically, there are 2-6 lines in the "drop" segment to each customer. The relatively exposed DSL transmission loop segment running between the pedestal and customer premises acts as an antenna, picking up the RF interference signals, especially the AM and ham radio broadcasts in the area, and even interference from appliances in the home. This segment is often not well shielded or employs shields that are not well grounded, leading to additional receipt of RF signals by the telephone line(s).

It is well known that the common-mode voltage of an xDSL loop can be used as a reference signal for noise and interference cancellation. Traditionally, the common-mode voltage of the xDSL loop is taken relative to board chassis ground for use in a digital noise canceller. However, board or chassis ground can have its own noise sources, which can interfere with the measurement of the common mode noise from the xDSL loop and thereby reduce performance of the noise cancellation system. This introduces a level of complexity and additional components that it would be desirable to eliminate.

Service providers often use loop length to estimate the data rate that they can offer to the customer. Clean loops without much noise and interference may not benefit much from noise cancellation and may already have a high potential data rate. Loops with a high level of interference will generally benefit most from noise cancellation. With noise cancellation, a set of loops of the same length will have more similar data rate potentials, allowing the service provider to guarantee a higher minimum data rate based on loop length alone. For example, a low-noise 12,000 foot ADSL loop may have a potential data rate of 5.0 Mbps but a high-noise 12,000 foot ADSL loop with a high level of AM radio interference may have a potential data rate of only 2.0 Mbps without noise cancellation.

What is needed is a noise cancellation system that will improve data rates of high noise xDSL loops so that data rates can approach maximum potential for a given loop length.

BRIEF SUMMARY OF THE INVENTION

A noise cancellation system has a first transformer with an input side and an output side, the input side having first and second taps coupled to a signal provider, and a center tap providing a first common-mode voltage signal. A first digital subscriber line (xDSL) modem has an input coupled to the output side of the first transformer and an output coupled to customer premises equipment (CPE) for providing an xDSL signal to the CPE. A second transformer has an input side and an output side, the input side having first and second taps coupled to a signal provider, and a center tap providing a second common-mode voltage signal. A second xDSL modem is coupled to the output side of the second transformer. The difference between the first and second common-mode voltage signals is provided to at least one of the first and second xDSL modems to filter out noise from the xDSL signal provided to that modem.

Further features and advantages of the present invention, as well as the structure and operation of various embodiments of the present invention, are described in detail below with reference to the accompanying drawings.

BRIEF DESCRIPTION OF THE DRAWINGS

The accompanying drawings, which are incorporated herein and form part of the specification, illustrate the present invention and, together with the description, further serve to explain the principles of the present invention and to enable a person skilled in the pertinent art to make and use the invention.

DETAILED DESCRIPTION OF THE INVENTION

The following detailed description of the present invention refers to the accompanying drawings that illustrate exemplary embodiments consistent with this invention. Other embodiments are possible, and modifications may be made to the embodiments within the spirit and scope of the invention. Therefore, the detailed description is not meant to limit the invention. Rather, the scope of the invention is defined by the appended claims.

Features and advantages of the invention are set forth in the description that follows, and in part are apparent from the description, or may be learned by practice of the invention. The advantages of the invention are realized and attained by the structure and particularly pointed out in the written description and claims hereof as well as the appended drawings. The following detailed description is exemplary and explanatory and is intended to provide further explanation of the invention as claimed.

The embodiment(s) described and references in the specification to "one embodiment," "an embodiment," "an example embodiment," etc., indicate that the embodiment(s) described may include a particular feature, structure, or characteristic. However, every embodiment may not necessarily include the particular feature, structure or characteristic. Moreover, such phrases are not necessarily referring to the same embodiment. When a particular feature, structure or characteristic is described in connection with an embodiment, it is understood that it is within the knowledge of one skilled in the art to effect such feature, structure, or characteristic in connection with other embodiments, whether or not explicitly described.

It would be apparent to one of skill in the relevant art that the embodiments described below can be implemented in many different embodiments of software, hardware, firmware, and/or the entities illustrated in the figures. Any actual software code with the specialized control of hardware to implement embodiments is not limiting of this description. Thus, the operational behavior of embodiments is described with the understanding that modifications and variations of the embodiments are possible, given the level of detail presented herein.

Some portions of the description that follow are presented in terms of algorithms and symbolic representations of operations on data that may be stored within a memory and operated on by a processor. These algorithmic descriptions and representations are the means used by those skilled in the art to effectively convey their work. An algorithm is generally conceived to be a self-consistent sequence of acts leading to a desired result. The acts are those requiring manipulation of quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, parameters, or the like.

The following detailed description includes several modules, which will be described below. These modules may be implemented by hardware components, such as logic, or may be embodied in machine-executable instructions, which may be used to cause a general-purpose or special-purpose processor programmed with the instructions to perform the operations described herein. Alternatively, the operations may be performed by a combination of hardware and software.

The present system and method is intended to be coupled with an interference canceller for xDSL systems but it is applicable to an arbitrary digital interference canceller. The idea is to use the difference between the common-mode voltages of two twisted-pair transmission lines as a noise or interference reference. This signal is filtered and sampled by an analog-to-digital converter for use by the digital interference cancellers. More detailed descriptions of noise canceller embodiments of the present system and method are set forth below in conjunction with the accompanying drawing figures.

Figure 1:
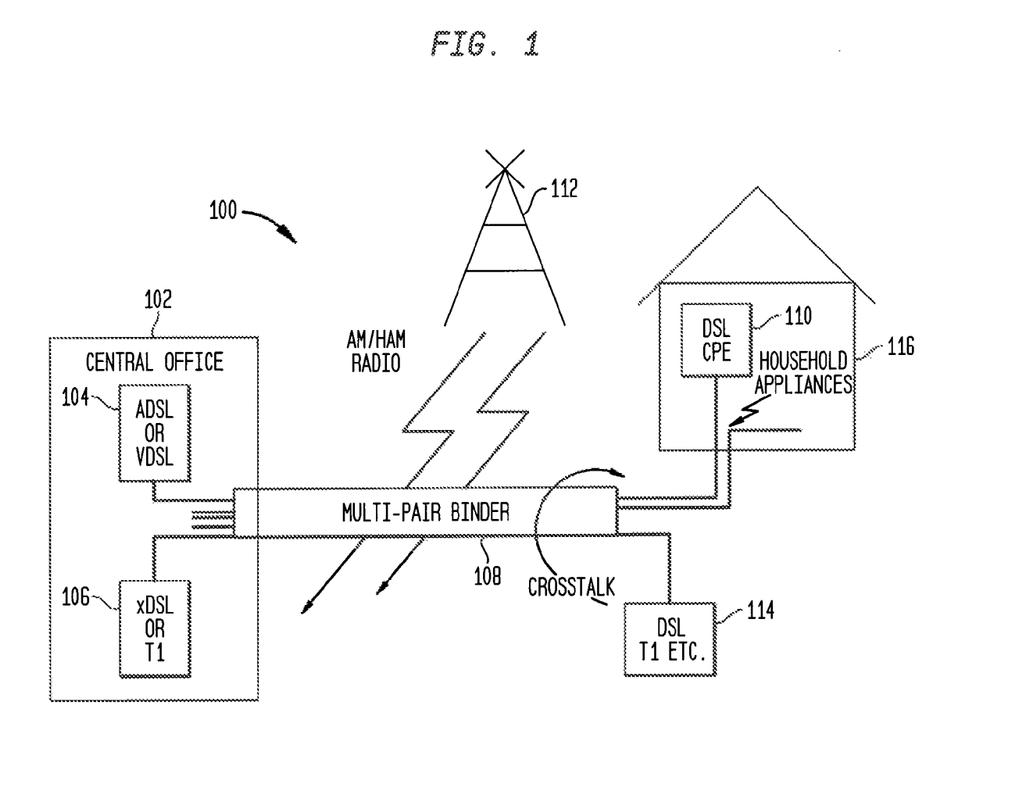
FIG. 1 shows an exemplary operating environment with which embodiments of this invention are associated.

FIG. 1 shows an Operating Environment 100 with which the noise canceller of the present system and method is used. The operating environment 100 includes a central office 102 of the telephone company (Telco or service provider). Central office 102 includes ADSL and/or VDSL modems 104 and/or xDSL and/or T1, etc. modems 106. Central office 102 outputs feed into multi-pair binders 108 that run from the central office 102 to consumer premises equipment (CPE) xDSL modems 110 and the like. Modems 110 are typically located in a customer's home or business. Interference or noise occurs from AM or ham radio signals 112 and/or crosstalk 114 due to multiple line pairs running through the multi-pair binder 108. In addition noise is generated by household appliances 116.

Every xDSL system must deal with the Signal to Noise Ratio (SNR) that is the result of the multiple noise sources affecting the signal on the lines running from central office 102 to CPE 110. The signal is attenuated as it travels down binder 108 from central office 102 to CPE 110, reducing SNR. Further, noise is associated with the xDSL transmission path, and further reduces the SNR of the transmission path. Lower SNR generally requires lower signal transmission rates to adequately decode the xDSL signal at the CPE.

Achieving an adequate SNR in xDSL systems is a challenge for the service providers. Some lines will have more noise than others. For CPE's that are further from central office 102, noise has a greater impact than for those that are closer to central office 102, due to the increasing signal attenuation and possibly larger noise pickup. Anything that can be done to reduce the noise level will improve SNR, enable higher data rates, and is thus valuable to the service provider.

Noise cancellation is one way to improve the SNR. The goal of many noise cancelling systems is to find an independent noise reference signal and to use the reference signal to cancel noise and interference on the DSL line, thereby increasing the effective SNR and increasing the potential data rate.

It is very desirable to have an independent reference (e.g., an independent pair of lines) that can measure the noise on the signal line and use that noise to cancel it on the xDSL signal line or pair. On the xDSL line differential mode, there is both signal and noise. On an ideal reference path there is just noise and no xDSL data signal. The present system and method uses frequency domain techniques operating on sampled data from the reference-path to cancel at least some of the interference or noise on the xDSL line.

Each multi-pair binder typically has between 50 and 100 pairs of lines. One skilled in the art would know that more or fewer pairs of lines can be carried by a binder. Each customer premises typically has at least two pairs of lines coming into it. In most cases, only one line is an xDSL line. The second pair is often unused, so that the second pair can be used as a noise reference to cancel out the noise on the xDSL line. Alternatively, the second pair can be "bonded" to the first pair. Bonding occurs when two or more independent xDSL signals are received at the CPE, but their data streams are combined at the upper communications layers so as to approximately double the data rate. Bonding can be used to address the effects of a single xDSL line with low SNR, but requires two front-ends at both the CPE and the central office, and therefore bonding is equipment intensive.

Figure 2:
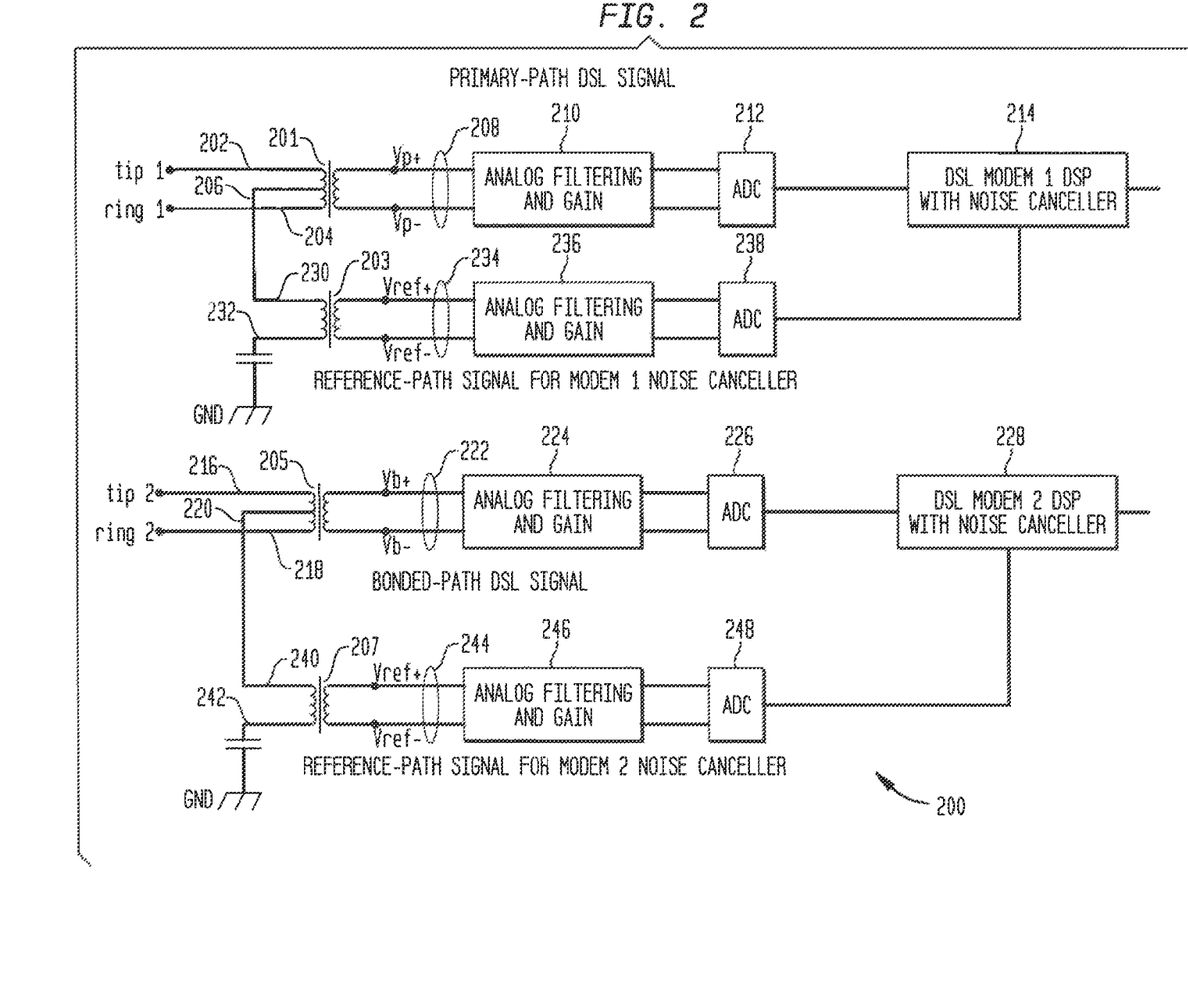
FIG. 2 shows an example of a known noise canceller system.

FIG. 2 shows a known system and technique for cancelling noise on a bonded pair of xDSL lines. This known system 200 includes a tip 1 line 202 and ring 1 line 204 coming from central office 102 via binder 108 into the input side of a transformer 201. Transformer 201 includes a center tap 206. Throughout this disclosure, the side of the transformer coupled to central office 102 or binder 108 is referred to as the input side, even though it is understood and acknowledged that signals may flow in either direction (e.g., from central office 102 to CPE 110 or from CPE 110 to central office 102). The side of the transformer coupled to CPE 110 is referred to as the output side.

The output side of transformer 201 contains a primary path xDSL signal 208 having a positive voltage side $V_{P+}$ and a negative voltage side $V_{P-}$ feeding into an analog filtering and gain (AFG) unit 210. The output of AFG 210 feeds into an analog/digital converter (ADC) 212, the output of which feeds into an xDSL modem digital signal processor (DSP) with noise canceller 214. The output of xDSL modem 1 214 is applied to CPE 110 and provides user data. Center tap 206 on the input side of line 202 is connected to a first tap 230 of a transformer 203, the other tap 232 of which is connected to ground. Accordingly, transformer 203 measures the common mode noise voltage of primary path xDSL signal 208, relative to ground. The output side of transformer 203 comprises a reference noise signal 234 having a positive voltage side $V_{Ref+}$ and a negative voltage side $V_{Ref-}$, which are fed to an AFG circuit 236, the output of which feeds into an ADC 238. The reference noise signal 234 characterizes the noise on the primary path xDSL signal 208 measured relative to the grounded tap 232. The output of ADC 238 is applied to xDSL modem 214 to cancel the noise in the primary path xDSL signal.

The second signal line of the two line pair coming into the house duplicates the circuit of the first signal line. Thus an input line tip 2 216 and input line ring 2 218 coming from central office 102 via binder 108 are coupled to the input side of a transformer 205. The output side of transformer 205 comprises bonded path xDSL signal 222 having a positive voltage signal $V_{B+}$ and a negative voltage signal $V_{B-}$. The bonded path signal 222 feeds into an AFG circuit 224, the output of which feeds into an ADC 226. The output of ADC 226 is applied to an xDSL modem 2 DSP with Noise Canceller 228 and also provides user data. As discussed above, bonded systems combine data streams at upper communications layers to approximately double the user data rate when two xDSL lines are bonded. Of course it would be apparent to one skilled in the relevant art that more than two pairs can be bonded to further increase data rate.

Transformer 205 has a center tap 220 at its input side. Center tap 220 is applied to a first tap 240 on the input side of a transformer 207, the other tap 242 is coupled to ground. Accordingly, transformer 207 measures the common mode noise voltage of primary path xDSL signal 222, relative to ground. The output side of transformer 207 comprises a reference noise signal 244 having a positive voltage signal $V_{Ref+}$ and negative voltage signal $V_{Ref-}$, which make up the reference noise signal for modem 2 noise canceller 228. These outputs are applied to an AFG Circuit 246, the output of which is applied to an ADC 248. The reference noise signal 244 characterizes the noise on the bonded path xDSL signal 222, as measured relative to the grounded tap 240. The output of ADC 248 is fed to xDSL modem 2 DSP with noise canceller 228 to cancel out the noise in the bonded path xDSL signal. The noise cancellation in xDSL modems 214 and 228 can be performed tone-by-tone in the frequency domain, and is further described in U.S. patent application Ser. No. 12/287,577, titled, "Adaptive Frequency-Domain Reference Noise Canceller for Multicarrier Communications Systems", which is incorporated herein by reference in its entirety.

It is noted that the known system in FIG. 2 requires four signal paths, two for each line. Two of the four signal paths are used as reference noise signal paths that each require their own gain, filtering, and ADC processing. In other words, four front-ends are required to provide noise cancellation for this bonded configuration. Embodiments of the present invention improve on the known system by reducing the number of signal paths. As discussed in more detail below, embodiments of the present invention require at most only three signal paths, thereby significantly reducing the amount of components needed to provide xDSL signals to the CPE.

Figure 3:
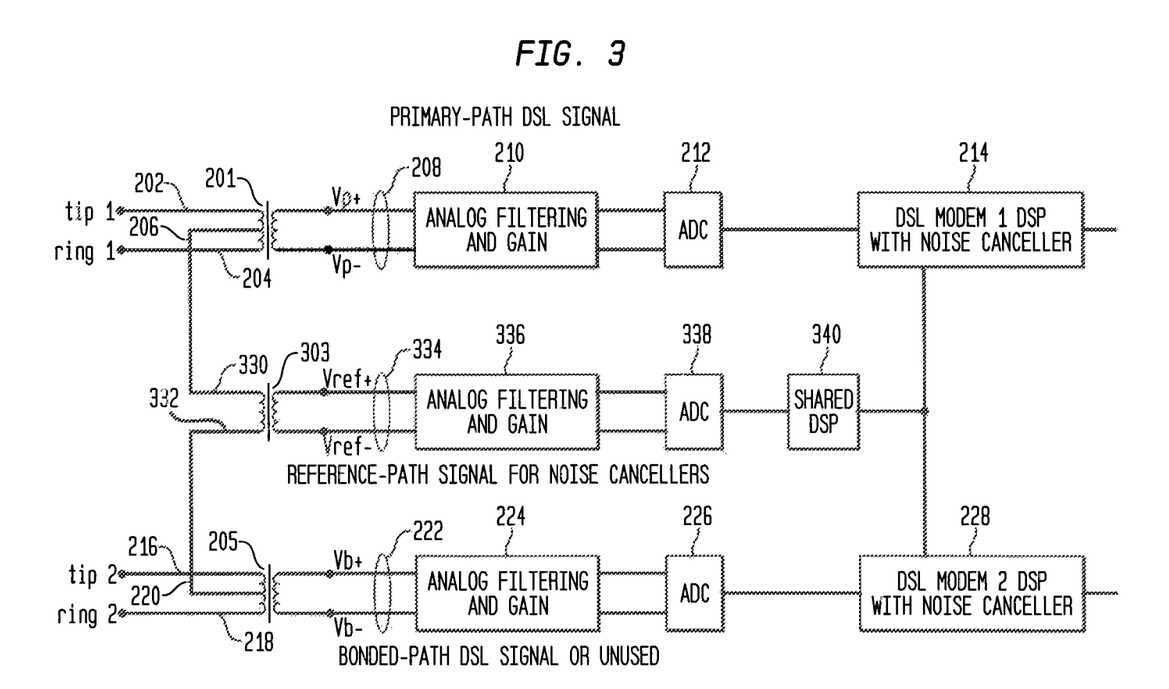
FIG. 3 shows a circuit diagram of an embodiment of the noise canceller of this invention.

FIG. 3 shows the system and method incorporating the noise canceller, according to one embodiment of this invention. Similar elements to those described above will not be described further. The system and method of this embodiment includes a single reference noise path for noise cancellers. The single reference noise path includes a transformer 303, the input sides of which are connected to primary path transformer 201 and to bonded path transformer 205. Specifically, center tap 206 of primary path transformer 201 is coupled to a first tap 330 of the input side transformer 303. The second tap 332 of transformer 303 is coupled to center tap 220 of bonded path transformer 205. The common mode voltages of the primary and bonded xDSL paths are measured at their respective center taps 206 and 216. Accordingly, by coupling the center taps 206, 220 to the inputs of transformer 303, the transformer 303 detects the difference between the common mode voltages of the primary and bonded xDSL paths, where this difference is representative of the noise on each of the xDSL lines 208 and 220.

The output side of transformer 303 comprises a reference noise signal 334, composed of $V_{Ref+}$ and $V_{Ref-}$, which is applied to an AFG Circuit 336, where the reference noise signal 334 represents the noise on both of the xDSL lines 208 and 222 as indicated above. The output of circuit 336 is applied to the input of an ADC 338. The output of ADC 338 is applied to a shared DSP 340 which is coupled to xDSL modem 1 DSP with noise canceller 214 and to xDSL modem 2 DSP with noise canceller 228. Thus, the output of the shared DSP 340 represents a noise cancelling signal which cancels the noise on primary path xDSL signal line 208 and bonded path xDSL signal line 222, thereby reducing the noise on output for xDSL modem 1 DSP 214 and xDSL modem 2 DSP 228.

Compared to FIG. 2, the noise cancellation system of FIG. 3 only requires one reference noise signal path (as opposed to two) and therefore has reduced component count and integration costs. Accordingly, a bonded pair xDSL system having noise reduction using the present system and method only requires three signal paths compared with four signal paths for the system in FIG. 2. This is significant reduction in component count/costs. Further, the noise cancellation system of FIG. 3 does not measure common mode noise with respect to board or chassis ground, and therefore the reference noise measurement in the present system and method is less prone to interference from board noise. One skilled in the art of common-mode noise cancellation system design will appreciate the challenges associated with board noise pick-up on the common-mode path.

Figure 4:
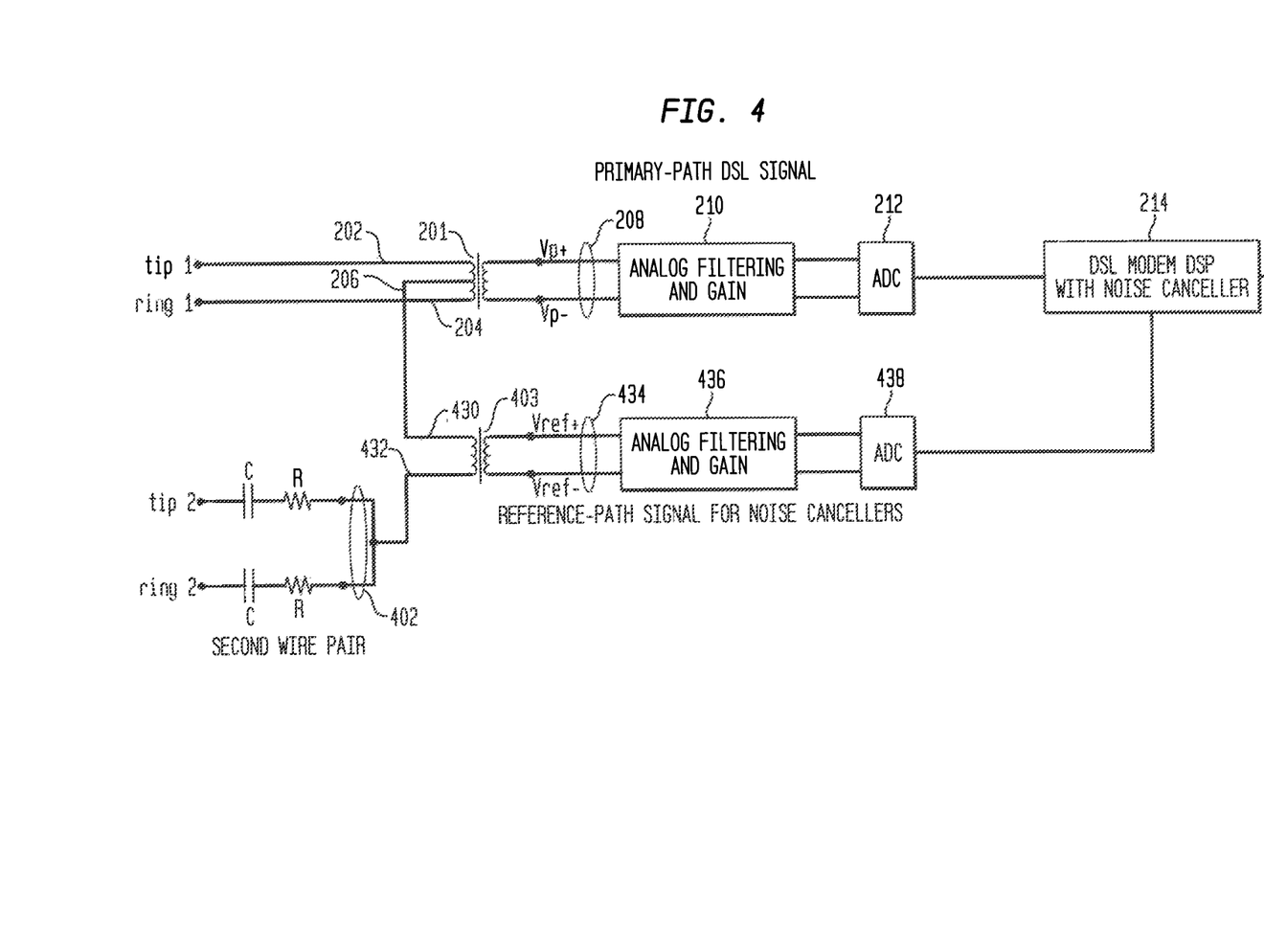
FIG. 4 shows a circuit diagram of a further embodiment of the noise canceller of this invention.

FIG. 4 shows a second embodiment of the system and method incorporating the noise canceller of this invention. Again similar elements to those described above will not be described further in detail. In this embodiment, center tap 206 of primary xDSL path 208 is coupled to a first tap 430 of the input side of a transformer 403. The other tap 432 of transformer 403 is coupled to a terminated second wire pair 402 at a common terminal, where the terminated wire pair 402 may or may not be connected all the way to the central office 102. This is typically the unused second pair provided to the customer premises, where the resistors R and capacitors C provide the transmission line termination that is tapped at 432 by the transformer 403. The output side of transformer 403 comprises a reference noise signal 434 having $V_{Ref+}$ and $V_{Ref-}$ signals which provide a noise reference that is applied to an AFG Circuit 436, the output of which is applied to an ADC 438. The output of ADC 438 is applied to an xDSL modem DSP with Noise Canceller 414 to cancel the noise from the primary path xDSL signal 208. An advantage of using the common-mode of terminated wire pair 402 as the ground reference is that it avoids using board or chassis ground, which has its own inherent noise problems as discussed above.

It would be apparent to one skilled in the relevant art that the second pair could be used as well for POTS, xDSL or both, for example. The terminating R and C allow this pair to be used. In that case, the phone or modem would tap from a different portion of the line, such as from another room in the house or office.

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents. Additionally, all patents, patent applications and publications mentioned above are incorporated herein by reference.

What is claimed is:

1. A noise cancellation system, comprising:
   a first transformer having an input side and an output side, the input side having first and second taps coupled to a communication service provider and further having a center tap;
   a first digital subscriber line (xDSL) modem having an input coupled to the output side of the first transformer and an output coupled to customer premises equipment (CPE) for providing an xDSL signal to the CPE;
   a second transformer having an input side and an output side, the input side having first and second taps coupled to the communication service provider and further having a center tap;
   a second xDSL modem coupled to the output side of the second transformer; and
   a third transformer having an input side and an output side, the input side of the third transformer having one tap coupled to the center tap of the first transformer, and a second tap coupled to the center tap of the second transformer,
   the output side of the third transformer being coupled to the first and second xDSL modems to reduce noise in the xDSL signal provided to the CPE.

2. The noise cancellation system of claim 1, wherein the first xDSL modem includes a digital signal processor (DSP) with a noise canceller.

3. The noise cancellation system of claim 2, wherein the second xDSL modem includes a second DSP with a noise canceller.

4. The noise cancellation system of claim 3, further comprising:
   a third DSP having an input coupled to the output side of the third transformer and an output coupled to the first and second xDSL modems.

5. The noise cancellation system of claim 4, further comprising:
   an analog filter and gain (AFG) circuit having an input side coupled to the output side of the third transformer and an output side; and
   an analog/digital converter (ADC) having an input side coupled to the output side of the AFG circuit and an output side coupled to the input of the third DSP, the output of the third DSP being coupled to respective inputs of the first and second xDSL modems.

6. The noise cancellation system of claim 2, further comprising:
   an analog filter and gain (AFG) circuit having an input side coupled to the output side of the first transformer and an output side; and
   an analog/digital converter (ADC) having an input side coupled to the output side of the AFG circuit and an output side coupled to an input of the DSP.

7. The noise cancellation system of claim 6, further comprising:
   a second DSP having an input coupled to the output side of the third transformer and an output coupled to the first and second xDSL modems.

8. The noise cancellation system of claim 7, further comprising:
   a second AFG circuit having an input side coupled to the output side of the third transformer and an output side; and
   a second ADC having an input side coupled to the output side of the second AFG circuit and an output side coupled to the input of the second DSP, the output of the second DSP being coupled to respective inputs of the first and second xDSL modems.

9. The noise cancellation system of claim 1, wherein the third transformer is configured to detect a difference between a first common mode voltage of a first xDSL line coupled to the first transformer and a second common mode voltage of a second xDSL line coupled to the second transformer.

10. The noise cancellation system of claim 9, wherein the difference between the first and second common mode voltages characterizes the noise on the first xDSL line and the second xDSL line.

11. A noise cancellation system, comprising:
a first transformer having an input side and an output side, the input side having first and second taps coupled to a communication service provider and further having a center tap;
an xDSL modem having an input side coupled to the output side of the first transformer and an output side coupled to customer premises equipment (CPE) for providing an xDSL signal to the CPE; and
a second transformer having an input side with first and second taps, the first tap being coupled to the center tap of the first transformer and the second tap being coupled to a terminated wire pair;
the second transformer having an output side coupled to the xDSL modem to reduce noise in the xDSL signal provided to the CPE.

12. The noise cancellation system of claim 9, wherein the first xDSL modem includes a digital signal processor (DSP) with a noise canceller.

13. The noise cancellation system of claim 12, further comprising:
an analog filter and gain (AFG) circuit having an input side coupled to the output side of the first transformer and an output side; and
an analog/digital converter (ADC) having an input side coupled to the output side of the AFG circuit and an output side coupled to an input of the DSP.

14. The noise cancellation system of claim 13, further comprising:
a second AFG circuit having an input side coupled to the output side of the second transformer and an output side; and
a second ADC having an input side coupled to the output side of the second AFG circuit and an output side coupled to an input of the DSP.

15. The noise cancellation system of claim 11, wherein the second tap of the second transformer is coupled to a common terminal of the terminated wire pair to provide a common mode of the terminated wire pair.

16. A noise cancellation system, comprising:
a first transformer having an input side and an output side, the input side having first and second taps coupled to a signal provider and further having a center tap and providing a first common-mode voltage signal;
a first digital subscriber line (xDSL) modem having an input coupled to the output side of the first transformer and an output coupled to customer premises equipment (CPE) for providing an xDSL signal;
a second transformer having an input side and an output side, the input side having first and second taps coupled to the signal provider and further having a center tap and providing a second common-mode voltage signal;
a second xDSL modem coupled to the output side of the second transformer;
means for taking the difference between the first and second common-mode voltage signals;
means for providing the difference to at least one of the first and second xDSL modems to filter out noise from the xDSL signal provided by that at least one modem; and
a third transformer having an input side and an output side, the input side of the third transformer having one tap coupled to the center tap of the first transformer, and a second tap coupled to the center tap of the second transformer,
the output side of the third transformer being coupled to the at least one xDSL modem to reduce noise in the xDSL signal provided to the CPE through the at least one xDSL modem.

17. The noise cancellation system of claim 16, wherein the at least one xDSL modem includes a digital signal processor (DSP) with a noise canceller.

18. The noise cancellation system of claim 16, further comprising:
a digital signal processor (DSP) having an input coupled to the output side of the third transformer and an output coupled to the at least one xDSL modem.

19. The noise cancellation system of claim 18, further comprising:
an analog filter and gain (AFG) circuit having an input side coupled to the output side of the third transformer and an output side; and
an analog/digital converter (ADC) having an input side coupled to the output side of the AFG circuit and an output side coupled to the input of the DSP, the output of the DSP being coupled to an input of the at least one xDSL modem.

20. The noise cancellation system of claim 16, wherein the signal provider comprises a communications service provider.

* * * * *